W. B. CUMMINS.
Sulky Plow.

No. 123,616.

Patented Feb. 13, 1872.

Witnesses:
John Becker.
Wm H. C. Smith.

Inventor:
Wm B. Cummins.
Per Munn & Co
Attorneys.

No. 123,616

UNITED STATES PATENT OFFICE.

WILLIAM B. CUMMINS, OF LEON, IOWA.

IMPROVEMENT IN SULKY-PLOWS.

Specification forming part of Letters Patent No. 123,616, dated February 13, 1872.

*To all whom it may concern:*

Be it known that I, WILLIAM B. CUMMINS, of Leon, in the county of Decatur and State of Iowa, have invented a new and useful Improvement in Sulky-Plows; and I do hereby declare that the following is a full, clear, and exact description thereof, which will enable others skilled in the art to make and use the same, reference being had to the accompanying drawing forming part of this specification, in which—

Figure 1:
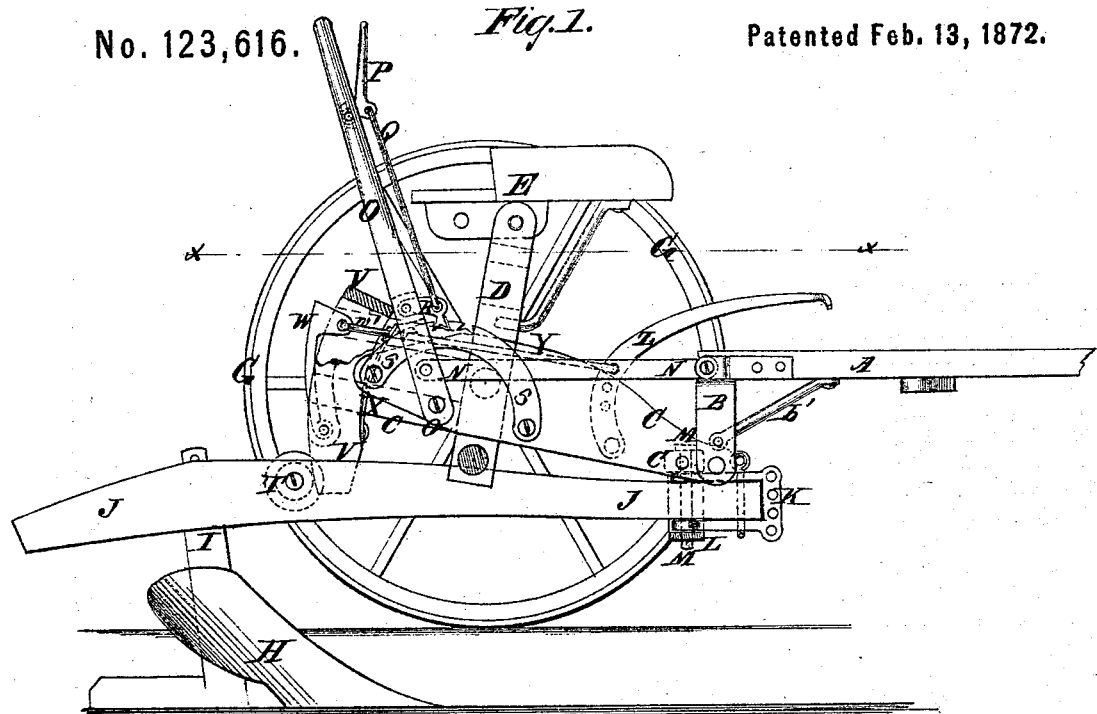
Figure 2:
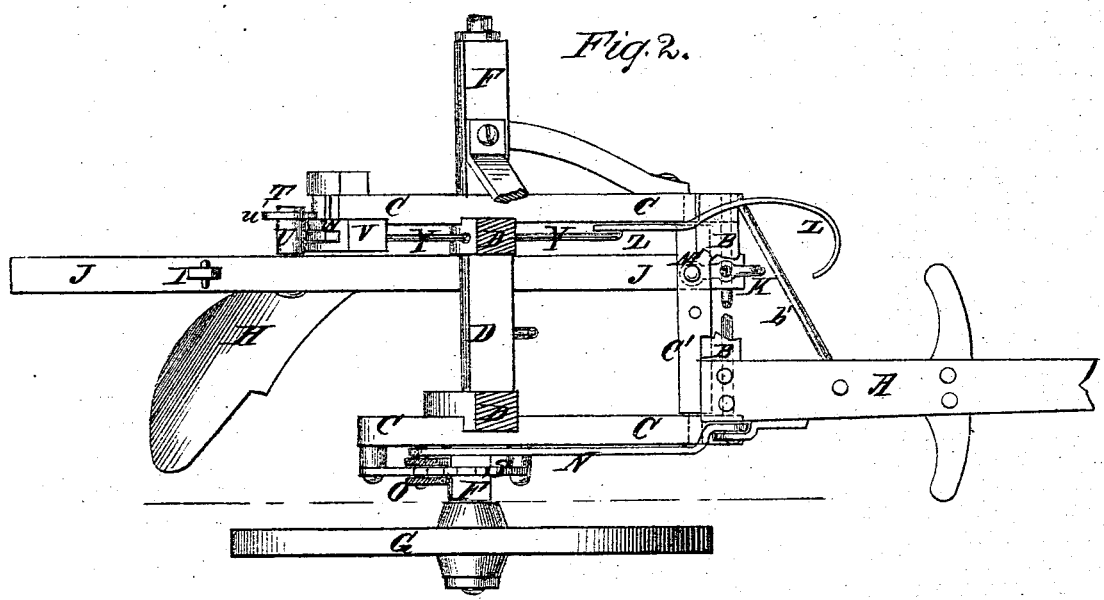

Figure 1 is a side view of my improved plow. Fig. 2 is a top view of the same, partly in horizontal section, through the line $x\,x$, Fig. 1.

Similar letters of reference indicate corresponding parts.

My invention has for its object to furnish an improved sulky attachment for plows, which shall be simple in construction and easily operated to raise the plow from the ground for convenience in turning and passing from place to place, and to again drop the plow into working position; and it consists in the construction and combination of various parts, as hereinafter more fully described.

A is the tongue, to the rear end of which is attached a curved bar, B, which is strengthened by braces $b'$. The ends of the curved bar B are pivoted to the forward ends of the bars C by a long bolt. The forward ends of the bars C are connected and held in their proper relative positions by a cross-bar or roller, $c'$, which is pivoted to said bars C. To the middle part of the bars C is attached an upright frame, D, to the upper end of which is attached the driver's seat E, which is made adjustable, so that it may be moved forward and back, as may be desired. To the frames C D are attached the inner ends of the axles F, upon the journals of which the wheels G revolve, the land-side axle being placed at a higher elevation than the plowed land-side axle, so that the frame of the machine may be held level, while one of the wheels is running in the furrow and the other upon the unplowed land. H is the plow, I the plow-standard, and J is the plow-beam. To the forward end of the plow-beam J is attached a clevis, K, to which the draft is attached in the ordinary manner. The forward end of the plow-beam J is passed through a keeper, L, attached to the under side of the round or bar $c'$, where it is secured in place by a pin or bolt, M, which passes through the said round or bar through the plow-beam J, and through the keeper L, and which may be the rear clevis-bolt. The bolt M thus gives the plow a free lateral movement, and the pivoted bar or round $c'$ gives it a free vertical movement. N is a bar, the forward end of which is pivoted to the rear end of the tongue A. The rear end of the bar N is pivoted to the lower part of the lever O, the lower end of which is pivoted to the side bar C, a little in the rear of the vertical plane of the axles. The upper end of the lever O extends up into such a position that it may be reached and operated by the driver from his seat E. To the upper part of the lever O is pivoted a small elbow-lever, P, to the short arm of which is pivoted the upper end of the connecting-rod Q, which passes down along the side of the lever O, and its lower end is pivoted to the pawl R, which is pivoted to the lower part of the said lever O in such a position as to take hold of the teeth or notches of the curved bar S, the ends of which are attached to the bar C, and which passes through the lower part of the lever O or through a keeper attached to said lever so as to serve as a support and guide to said lever in its movements. The engaging end of the pawl R and the notches in the bar S are so formed as to prevent movement in either direction. By this construction, by operating the lever O the rear end of the frame-work or bars C of the machine may be raised and lowered, lowering and raising the forward ends of said bars or frame C. This movement of the forward end of the frame or bars C, when the plow is in working position, lowers and raises the point of draft attachment, and thus enables the depth at which the plow works in the ground to be regulated at will. This same movement, in connection with the device hereinafter described, enables the plow to be conveniently raised from the ground for convenience in turning and passing from place to place. To the side of the plow-beam J is attached a pin, T, upon which is placed a friction-roller, U, having a flange, $u'$, formed around its outer end. The roller U is made of such a length as to receive the rear or convex edge of the curved bar V between its flange $u'$ and the plow-beam J. The curved bar V is securely bolted to the rear end of the bar C in such a position that its rear edge may rest against and move upon the roller U as the rear ends of the bars or frame C are raised or lowered. W is a curved catch-bar, which is placed in a recess in the rear or convex side of the bar V, and is pivoted at its lower end to said bar V. Upon the forward side of the upper end of the catch-bar W is formed or with it is connected an arm or rod, $w'$, which passes through the upper part of the bar V, and with its forward end is connected a spring, X, which holds the upper end of the catch-bar W projecting to the rearward, as shown in Fig. 1. By this construction, as the rear end of the bars or frame C is lowered the bar V moves down along the roller U, which forces the catch-bar W into the recess in the bar V. As the upper end of the catch-bar W passes beneath the roller U the spring X forces it outward, so that when the rear end of the bars or frame C is raised the upper end of the bar W may rest against the under side of the roller U and raise the plow from the ground. To the forward end of the bar or arm $w'$ is pivoted the rear end of the rod Y, which passes forward through a hole in the side bar of the vertical frame D, and its forward end is pivoted to the lever Z, the lower end of which is pivoted to the forward part of the bar C. The lever Z projects upward and is curved forward and inward into such a position that it may be conveniently reached and operated by the driver with his foot. By this construction, by pressing down upon the free end of the lever Z the catch-bar W will be drawn into the recess in the bar V, allowing the plow to drop to the ground.

Having thus described my invention, I claim as new and desire to secure by Letters Patent—

1. The arrangement of the tongue A, curved bar B, bars or frame C, round or bar $c'$, vertical frame D, seat E, axles F, wheels G, keeper L, connecting-bar N, lever O, elbow-lever P, connecting-rod Q, pawl R, notched bar S, with the plow-beam J, substantially as and for the purpose herein shown and described.

2. The combination of the pin T, flanged friction roller U $u'$, curved bar V, catch-bar W $w'$, spring X, connecting-rod Y, lever Z, lever O and its devices, segmental rack S, and frame C with the plow-beam J, substantially as shown and described, for the purpose specified.

WM. B. CUMMINS.

Witnesses:
H. C. BICHTOLD,
GEO. I. CUMMINS.